(No Model.)
C. WILSON.
LATHE CHUCK.
No. 326,005. Patented Sept. 8, 1885.
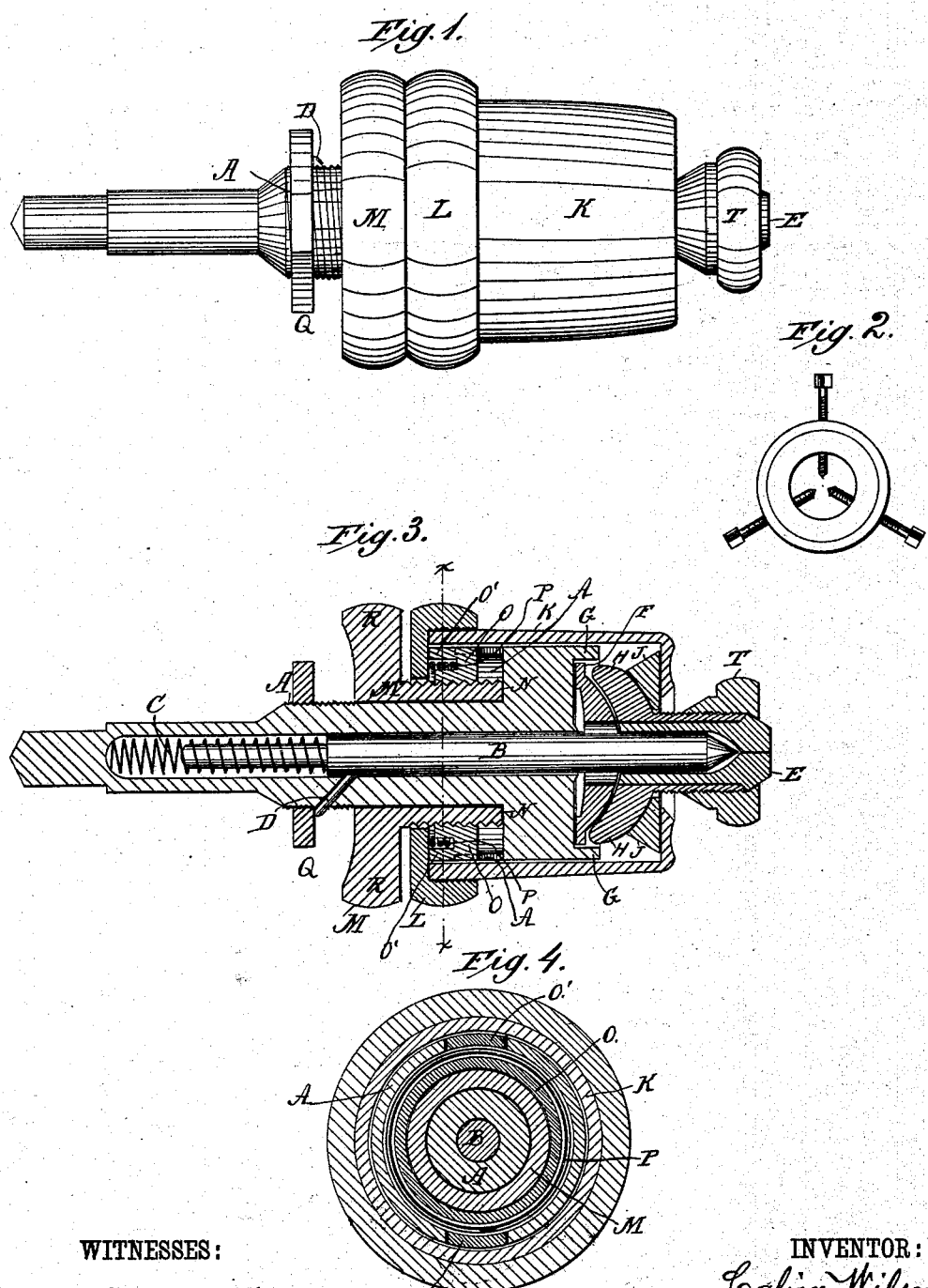
WITNESSES:
W. W. Hollingsworth
W. K. Stevens
INVENTOR:
Calvin Wilson
BY Munn & Co
ATTORNEYS.

UNITED STATES PATENT OFFICE.

CALVIN WILSON, OF CARO, MICHIGAN.

LATHE-CHUCK.

SPECIFICATION forming part of Letters Patent No. 326,005, dated September 8, 1885.

Application filed December 19, 1884. (No model.)

*To all whom it may concern:*

Be it known that I, CALVIN WILSON, a citizen of the United States, residing at Caro, in the county of Tuscola and State of Michigan, have invented certain new and useful Improvements in Lathe-Chucks, of which the following is a description.

This invention relates to that class of devices whereby work is held and revolved in a watch-maker's lathe; and it has for its object to center the work readily, to hold it firmly, and to render the chuck easy to be fixed upon the work or to be loosened therefrom.

To this end my invention consists in the construction and combination of parts forming a lathe-chuck, hereinafter described and claimed, reference being had to the accompanying drawings, in which—

Figure 1 is a longitudinal elevation of my drill-chuck in full. Fig. 2 is a front end view of a wire-holder to be used as a part of my chuck. Fig. 3 is a central longitudinal section of the chuck complete. Fig. 4 is a transverse section at $x$, Fig. 3.

A represents the body of the chuck, which fits firmly into the spindle of a lathe when in service. The body has a central bore to receive a centering-rod, B, and the spring C, which pushes it outward.

D represents a communicating pin, which enters the body A at an angle of about forty-five degrees and rests its inner end on the centering-rod B.

Q is a screw-nut threaded onto the body A and impinging against the outer or rear end of the pin D, to press the latter upon the rod B. By means of the nut Q the rod B may thus be fixed at any point so as not to slide out or in while in use or while work is removed.

E represents a common form of split jaws for a chuck, being three jaws in one piece, fitting neatly upon the rod B, to be centered thereby as usual.

F is a base-piece, plane on its rear side to rest squarely upon the plane front face of the body A within a dish of the latter formed by the annular rim G. The front side of the base-piece F is convex, properly formed as a spherical segment to serve as a base to an intermediate piece, H, which is concave in its rear to fit the piece F, and convex on its front face to fit into the concave rear side of a forward cup, J, whose front side is plane to fit the plane inner face of the shell K. The intermediate piece, H, has a forward-projecting sleeve, into which the split jaw-piece E fits.

L is the rear end of the shell, made as a removable ring for the purpose of admitting the interior parts of the chuck, and firmly secured, when the chuck is complete, to the main portion of the shell by screwing closely thereon. M is a screw turning freely upon the body A and bearing against the same at the shoulder N, which is the bottom of annular recess formed in the rear face of the large portion of the body.

O is a nut upon screw M, entering the said annular recess in the body A, and provided with wings O', to engage apertures in the body A, whereby the nut is kept from turning with the screw. The nut acts against the inner rear end, L, of the shell to draw it back upon the spherical parts F, H, and J, thereby clamping them against the forward end of the body.

P is a spring acting between the nut and the shell to keep the parts in place when not firmly screwed up.

Suppose a piece of work to be placed in the jaws E and to be secured by screwing the nut T back on the intermediate piece, H, until the concave cones of the nut and the said piece H bind upon the convex cones of the jaws. Now the work is centered, as usual, by revolving the lathe and holding a piece of wood on the lathe-rest and against the work. The concavo-convex form of the intermediate piece, H, permits it to align itself with the work, and when so aligned it is bound between the concave and convex forms J and F by turning back the screw M, and the chuck is ready for work. The broad spherical joints of F, H, and J permit alignment of parts with the work and hold the same firmly against displacement in service. The screw M is made to enter the nut O instead of acting on the outside thereof, as usual, in order that by its smaller body it may have less friction, and by means of the large flange R on the screw the same may be more forcibly turned by the hand, thus enabling the chuck to hold stronger upon the work.

A centering-rod, B, may be provided with a hollow forward end, instead of the pointed one shown, to receive the ends of pinions, &c.

The wire-holder, Fig. 2, is to be screwed onto the chuck in place of the nut T, and it is used for well-known purposes in connection with my centering mechanism.

What I claim as my invention, and desire to secure by Letters Patent, is—

1. The combination, with the centrally-bored body A, provided with a slanting hole in its side, of the centering-rod B, the spring C, the pin D, fitted to the said slanting hole, and the nut Q, screw-threaded upon the body to engage the said pin, substantially as shown and described.

2. The combination, with the body A, having a plane front end, and the shell K, having the inner face of its front end plane, both of the said planes being at right angles to the axis of revolution of the chuck, of the base-piece F, having a plane rear side and convex front side, the intermediate piece, H, having a concave rear side, a convex front side, and a forward-projecting screw-threaded sleeve, and the forward cup, J, having a plane front and a concave rear side, substantially as shown and described.

3. The combination, with the body A, the centering-rod B, the spring C, the shell K, the plano-convex base-piece F, the concavo-convex intermediate piece, H, having a screw-threaded forward projection, and the nut T, threaded upon the said projection, of the split jaw-piece E, fitting into the piece H and the nut T, substantially as shown and described.

4. The combination, with the shell K and the ring L, removably secured thereon, the internally-screw-threaded nut O, provided with wings O', and the screw M within the nut O, and provided with the flange R, of the body A, fitting within and against the front end of the screw surrounding the nut O, and provided with apertures for the wings O', substantially as shown and described.

CALVIN WILSON.

Witnesses:
HENRY J. MALLORY,
J. R. GILLESPIE.